United States Patent [19]

Romanowski

[11] Patent Number: 4,975,316
[45] Date of Patent: Dec. 4, 1990

[54] FIRE-RETARDANT BARRIER STRUCTURE

[76] Inventor: John C. Romanowski, 5 Spring Rd., Londonderry, N.H. 03053

[21] Appl. No.: 324,098

[22] Filed: Mar. 16, 1989

[51] Int. Cl.⁵ ............................................... B32B 7/00
[52] U.S. Cl. .................................... 428/247; 428/246; 428/920; 428/921
[58] Field of Search ................ 428/246, 247, 920, 921

[56] References Cited

U.S. PATENT DOCUMENTS

| | | | |
|---|---|---|---|
| 3,479,425 | 11/1969 | Lefevre et al. | 264/171 |
| 3,557,265 | 1/1971 | Chisholm et al. | 264/47 |
| 4,321,297 | 3/1982 | Adelman | 428/238 |

OTHER PUBLICATIONS

Brochure entitled "Saranex Films", Dow Chemical Company, Form No. 500-1071-84, 1984.

Primary Examiner—James J. Bell

[57] ABSTRACT

A fire-retardant laminated plastic material which includes a woven barrier layer of high-density polyethylene sandwiched between outer layers of low-density polyethylene material in which a polymer of antimony trioxide is incorporated in the outer layers. Additional outer layers may be laminated to the structure to serve as a carrier of pigments or to increase abrasion resistance of the structure.

8 Claims, 1 Drawing Sheet

FIRE-RETARDANT BARRIER STRUCTURE

This invention relates in general to a laminated barrier structure composed of multi-layered plastic films and in particular to a composite, laminated-plastic fire-retardant fabric which includes a layer of coated plastic scrim.

BACKGROUND OF THE INVENTION

Plastic barrier materials are involved in an almost unlimited range of products and applications. Containers, wrappers, pouches and bottles of varying degrees of flexibility for foods, pharmaceuticals, chemicals, and myriad other products are commonplace. In addition to containing and protecting products, barrier sheet materials are used to protect equipment and even personnel from a wide range of environmental hazards. One application of such barriers having particularly stringent demands is that of protecting military personnel, equipment, and supplies. Here, in addition to being fire-retardant, the material should protect against a wide range of chemical and biological agents. It should also resist penetration by liquids, gases, dust, including radioactive dust and not be susceptible to deterioration from ultraviolet light. Of course, the material should also be durable and relatively easily repaired when torn or punctured. In some instances where the barrier material is to be used in tents, equipment enclosures, or covers, it should have an outer surface in a mat finish and dull color to escape detection from the air. The outer surface should also be "printable" in that it should easily accept printed patterns such as those needed for camouflage.

Because the attainment of some of these qualities often results in the sacrifice of others, there is not presently available a material which even nearly satisfies the needs of the military, and a general object of the present invention is the provision of such a material having in substantial measure all of the desired qualities.

One of the better known commercial films sometimes used as a barrier is the copolymer of vinylidene chloride and vinyl chloride sold by the Dow Chemical company under the trademark SARAN®. It has a high resistance to attack by a wide range of chemicals, it has low permeability to gases and vapors, and it has high transparency. Moreover, it can be bonded or sealed to itself and to many other materials and substrates for special applications. The Dow company has made and sold widely combinations of SARAN® and outer layers of polyolefin resins including low density polyethylene (LDPE) and ethylene vinyl acetate (EVA) under the trademark SARANEX®. The SARANEX® films in turn have been further laminated or bonded to yet other materials. In an attempt to fill the need for a fire-retardant barrier film, it is believed that among the materials Dow has included with or added to SARANEX® is chlorinated polyethylene. However, it is believed that such combinations were not successful in meeting the requirements of a practical fire-retardant barrier.

Therefore, a principal object of the present invention is a barrier film which exhibits a high degree of fire-retardant qualities.

A further object is a barrier film which is not only fire-retardant but which also resists penetration by liquids, gases, and dusts, particularly radioactive dust.

Another object is a barrier film which is durable and relatively easily produced on a large scale.

Still another object is a fabric which is highly resistant to degradation caused by environmental factors including exposure to weather and ultraviolet radiation.

Yet another object is a barrier film which has low reflective qualities as to both light and radar illumination and is relatively indistinguishable from land background.

SUMMARY OF THE INVENTION

Generally, the present invention involves a combination of two basic components. The first component is a modification of conventional coextruded five-layer SARANEX® film. Basically, the modification involves adding fire-retardant material such as a polymer of antimony trioxide to the low-density polyethylene layers which normally constitute the outer sandwiching layers of the SARANEX® film. A further layer of low-density polyethylene may be added to one side of the modified SARANEX® film to serve one or more purposes such as increasing abrasion resistance, carrying pigment or other additives to give desired coloration reflection characteristics or resistance to ultraviolet radiation or even to serve as a printing surface for such purposes as camouflage.

The second basic component of the barrier structure includes a layer of scrim woven from narrow tapes of high-density polyethylene material in which fire-retardant has been incorporated. The layer of scrim is then coated on both sides with molten layers of low-density polyethylene material which also incorporate fire-retardant additives. Finally, the two basic components are joined to form the fire-retardant barrier fabric of the invention.

For a better understanding of the present invention, together with other and further objects, features, and advantages, reference should be had to the following description of preferred embodiments which should be read with reference to the appended drawing in which:

DESCRIPTION OF PREFERRED EMBODIMENTS

Figure 1:
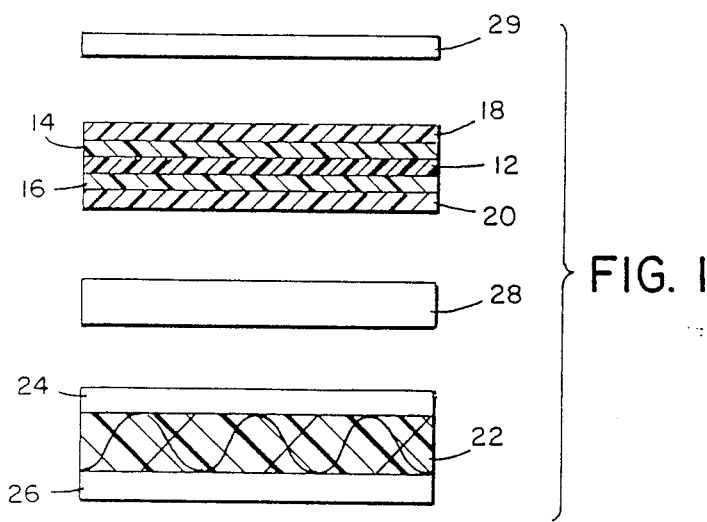
FIG. 1 is an exploded schematic cross-section of a composite fabric embodying the present invention.

In the upper part of FIG. 1, there is shown a first basic component made of SARANEX® film modified in accordance with the present invention. As has been noted, conventional unmodified SARANEX® film is composed of a layer of high-barrier resin such as SARAN® sandwiched between outer layers of polyolefin resins. The high-barrier resin is a copolymer of vinylidene chloride and vinyl chloride which may or may not contain other additives and the outer layers are usually composed o low-density polyethylene.

The embodiment of FIG. 1, however, includes the usual high-barrier resin layer 12 approximately 0.25 (¼) mil in thickness sandwiched between outer adhesive layers 14 and 16 generally of EVA or LDPE which may also be about 0.200 (1/5) mil in thickness. To the top of the sandwich, an upper layer 18 of low-density polyethylene of about 0.675 (2/3) mil in thickness is applied, and at the bottom of the sandwich a similar lower layer 20 of low-density polyethylene of about 0.675 mil thickness is present. Both of these external layers of the first basic component incorporate about 10–30% fire-retardant material as a constituent, and the top layer may further include pigments for color, ultraviolet resistant additives and have a mat finish.

Alternatively, yet another layer 29 of low-density polyethylene material of 0.50 to 2.0 mils in thickness may be laminated to the upper layer 18 for even greater abrasion resistance or to serve as a more rugged carrier of the color pigments or ultraviolet resistant materials. The total thickness of the first component may be 2–4 mils.

The second basic component of the structure is shown in the lower part of FIG. 1. It includes a substrate 22 in the form of a layer of scrim of about 3.0 mils in thickness. The scrim is woven from yarn or narrow tapes of high-density polyethylene material (HDPE) approximately 1.5 mils in thickness which also incorporates 0.5–10% fire-retardant material in both the warp and the fill. The scrim may be of 950±50 denier of about 10×10 count with no color added.

Coatings or laminations 24 and 26 of low-density polyethylene material each of about 0.50 to 2 mils in thickness are bonded to the upper and lower scrim surfaces respectively. The coating 24, especially when serving as an adhesive layer, may be somewhat thinner than the layer 26. In the coating layers 24 and 26, there is also included 10–30% fire-retardant material.

The two primary components are joined together to form the composite barrier fabric. Several methods of joining the layers are practical. For example, the films may be sealed together without adhesive by bringing the layers to a softening point and passing them between pressure rolls. To achieve a successful bond, the heat, pressure, and dwell time must be adjusted in accordance with the type and thickness of the film materials.

Alternatively, an adhesive coating or layer 28 may be used between components, and the adhesive may be activated by a suitable hot roll.

Figure 2:
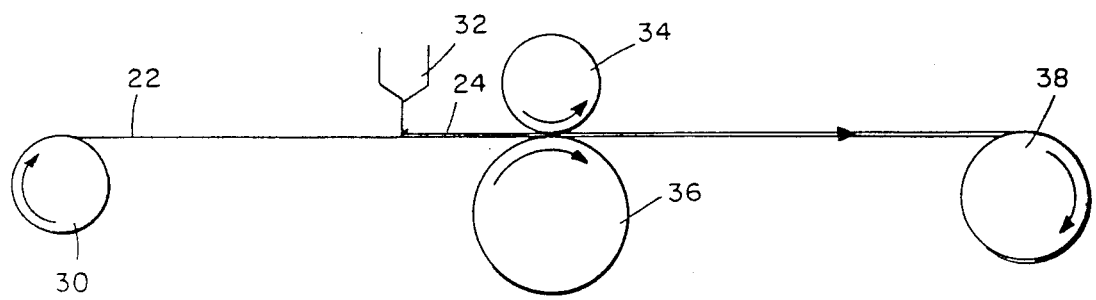
FIG. 2 illustrates one process step in making the composite fabric of the invention.

FIG. 2 illustrates schematically equipment for conducting the first step in laminating scrim or second basic component to its adjacent layers. A roll of uncoated scrim material of the type described above is carried on the reel 30. The scrim material is passed from the supply reel under an extruder die 32, from which a layer of low-density polyethylene material is deposited upon one surface of the scrim to a thickness of 0.5 to 2.0 mils. The deposited layer may contain fire-resistant material as well as other additives if desired. As the scrim continues from left to right as shown in the drawing, it passes between a nip roll 34 and a chill roll 36. The nip roll is Teflon ®-coated, and the chill roll may have a surface which produces a mat finish. The coated scrim roll is then accumulated on a wind-up roll 38.

Figure 3:
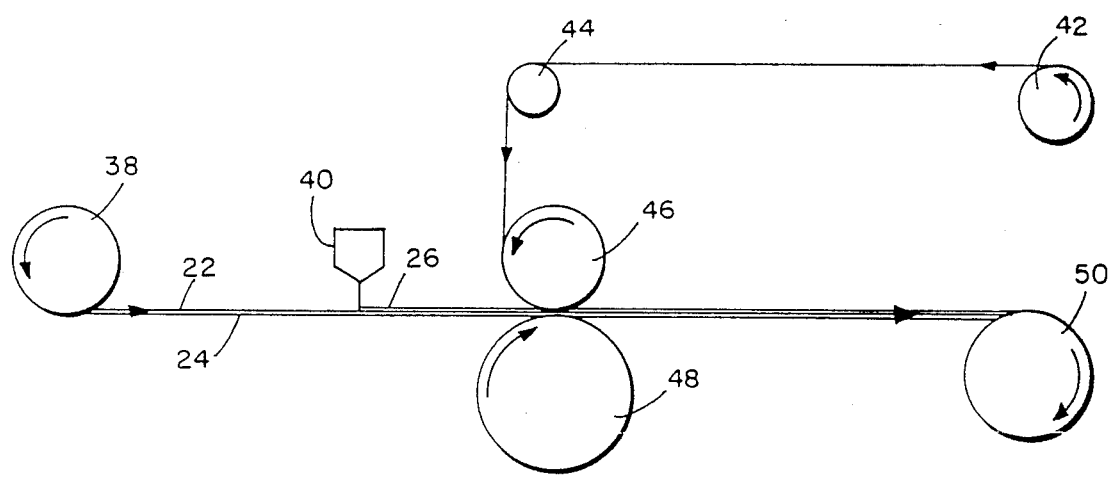
FIG. 3 similarly shows another process of making the composite fabric.

FIG. 3 illustrates a second step in the process. Coated scrim material from the reel 38 with the uncoated side facing upwardly is passed beneath another extruder die 40, at which point a layer of low-density polyethylene material also with added fire-resistant material is deposited to a depth of about 1 mil. Modified SARANEX ® film from a reel 42 is unwound in a right-to-left direction about an idler roll 44 to be joined with the scrim material as both components are passed between a nip roll 46 and a chill roll 48. The modified SARANEX ® film component from the reel 42 may include color additives as well as fire-resistant material. The composite product emerges from the rolls 46 and 48 and is taken up on a wind-up reel 50.

The sequence may be repeated if it is desired to add further layers of material for color or pattern printing on either or both of the outer surfaces.

Throughout this specification, reference has been made to "fire-retardant" material to be incorporated in or added to various components. Except in the scrim, as noted above, the preferred material is a polymer of antimony trioxide in 10–30% concentration. By way of example, the chemical composition of one of the layers used is (in percentages):

75.7 LDPE Virgin Resin
5.4 Color Pigment
18.9 Fire Retardant

The LDPE should be an extrusion grade resin such as that sold under the trade names Eastman Kodak #808P or Southern Petro NA 203. The melt index may be varied, but one of about 7 is preferred. The color pigment may be AMPACET LD 0925 and the fire retardant may be PPG Industries #FSPE 105 or equivalent materials.

The various examples and processes described above have in common the incorporation of fire retardant antimony trioxide in the low-density polyethylene layers which normally serve as the outer layers of SARANEX ® film. In most instances, it is desirable that fire-retardant material also be incorporated in various other polyethylene layers as well as in the scrim material. However, it is the modification of the SARANEX ® layer and its combination with the woven scrim having fire-retardant constituents which contribute greatly to the fire-retardant and chemical barrier qualities in the ultimate barrier product. Thus, the present invention should not be limited to precise details of the examples or processes, but only by the spirit and scope of the appended claims.

What is claimed is:

1. A fire-retardant barrier fabric comprising a first component of polyvinyl/polyvinylidene film which includes outer layers of low-density polyethylene containing fire-retardant material, said first component being laminated to a second component which comprises a layer of scrim woven from high-density polyethylene material sandwiched between two layers of low-density polyethylene material, all said polyethylene material in said second component also containing fire-retardant material.

2. A fire-retardant barrier fabric as defined in claim 1 wherein said outer layers of said film include 10–30% fire-retardant material.

3. A fire-retardant barrier fabric as defined in claim 2 wherein said scrim comprises a substrate woven from tapes of approximately 950 denier and 10×10 count per inch in warp and fill.

4. A fire-retardant barrier fabric as defined in claim wherein said scrim includes 0.5 to 10% fire-retardant material.

5. A fire-retardant barrier fabric as defined in claim 1 wherein said fire-retardant material in said low-density polyethylene material is composed of 10% to 30% antimony trioxide polymer.

6. A fire-retardant barrier fabric as defined in claim 1 wherein said first component is approximately 2–4 mils in thickness and said second component includes a scrim layer of approximately 3.0 mils in thickness.

7. A fire-retardant barrier fabric as defined in claim 6 and further including a top layer of 0.5 to 2.0 mils thick low-density polyethylene material laminated to the outer layer of said first component to add abrasion resistance and serve as a carrier of pigments.

8. A fire-retardant barrier fabric comprising a first component which includes a modified multi-layer polyvinyl/polyvinylidene film, the outer layers of said film including 10–30% of antimony trioxide polymer, and a second component laminated to said first component and including a scrim woven from tapes of high-density polyethylene material containing 0.5 to 10% antimony trioxide polymer, said scrim being sandwiched between two layers of low-density polyethylene containing 10–30% of antimony trioxide polymer.

* * * * *